(12) United States Patent
Li

(10) Patent No.: US 11,118,988 B2
(45) Date of Patent: Sep. 14, 2021

(54) METHOD FOR CALCULATING EARTH PRESSURE LOAD ON A TUNNEL

(71) Applicant: SOOCHOW UNIVERSITY, Suzhou (CN)

(72) Inventor: Pan Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 294 days.

(21) Appl. No.: 16/349,307

(22) PCT Filed: Nov. 12, 2016

(86) PCT No.: PCT/CN2016/105542
§ 371 (c)(1),
(2) Date: May 13, 2019

(87) PCT Pub. No.: WO2018/086085
PCT Pub. Date: May 17, 2018

(65) Prior Publication Data
US 2020/0182718 A1    Jun. 11, 2020

(51) Int. Cl.
*G01L 5/00* (2006.01)
*E21F 17/18* (2006.01)
(Continued)

(52) U.S. Cl.
CPC .............. *G01L 5/00* (2013.01); *G01B 11/167* (2013.01); *G01S 17/89* (2013.01); *G06F 30/23* (2020.01); *E21F 17/18* (2013.01); *G06F 17/13* (2013.01)

(58) Field of Classification Search
None
See application file for complete search history.

(56) References Cited

U.S. PATENT DOCUMENTS 10,774,640 B2 *   9/2020   Simon ................... E21D 11/05

FOREIGN PATENT DOCUMENTS

| CN | 102982247 A | 3/2013 |
|---|---|---|
| CN | 103593558 A | 2/2014 |

(Continued)

OTHER PUBLICATIONS

Riederer ("Modelling of Ground Support in Tunnelling Using the BEM"; Dec. 20, 2009). (Year: 2009).*

*Primary Examiner* — Roy Y Yi
(74) *Attorney, Agent, or Firm* — SZDC Law PC

(57) ABSTRACT

A method for calculating an earth pressure load on a tunnel includes the following steps: (1) taking interaction between external soil and a tunnel structure in an actual operation condition as an earth pressure load acting on the tunnel structure; (2) establishing a physical model for the tunnel structure; (3) designing, on the basis of the physical model for the tunnel structure, a plurality of structural loads in different operation conditions to obtain a plurality of different structural deformations; and (4) drawing an inference according Betti's theorem, and establishing a physical model for an original structure, such that a load on the original structure, namely an earth pressure load on the tunnel, can be directly calculated according to a load-deformation relationship of the physical model and deformation of the original structure. The above method can determine distribution and size of an actual earth pressure load on a tunnel.

6 Claims, 5 Drawing Sheets

(51) Int. Cl.
*G06F 17/13* (2006.01)
*G06F 30/23* (2020.01)
*G01B 11/16* (2006.01)
*G01S 17/89* (2020.01)

(56) References Cited

FOREIGN PATENT DOCUMENTS

| | | | |
|---|---|---|---|
| CN | 105136370 A | | 12/2015 |
| CN | 105787193 A | | 7/2016 |
| CN | 106547986 A | * | 3/2017 |
| CN | 106547986 A | | 3/2017 |
| JP | 2012255320 A | | 12/2012 |
| JP | 2016121487 A | | 7/2016 |

* cited by examiner

METHOD FOR CALCULATING EARTH PRESSURE LOAD ON A TUNNEL

This application is the National Stage Application of PCT/CN2016/105542, filed on Nov. 12, 2016.

FIELD OF THE INVENTION

The present invention relates to the theory of a tunnel and an underground engineering foundation, and particularly relates to a calculation method for earth pressure load of a tunnel during operation period.

BACKGROUND OF THE INVENTION

After years of operation, the tunnels built in the early years have problems such as longitudinal uneven settlement, lateral deformation and long-term leakage, which reduces the quality of tunnel service and poses a certain threat to operational safety. During the operation period, effective evaluation of structural performance and reasonable measures to control tunnel diseases are important guarantees for ensuring rail transit safety. The earth pressure load is the boundary condition for the calculation of tunnel structure performance.

In the prior arts, the continuum theory regards the complex soil action and the tunnel structure as a unified mechanical system, and the stress of contact surface between different materials as the earth pressure. This theoretical concept is in accordance with the mechanical principle of underground engineering, but there are problems of complex modeling. The current load-structure model theory simplifies the complex soil action into the load on the structure. The mechanical principle is simple, clear and easy to model. Theoretically, it can adapt to the complex and variable geological environment, but it is necessary to assume the load mode to reflect the soil action, so it is not possible to reflect changes in the soil environment, and there is a problem that the parameters are difficult to determine. The current back analysis of earth pressure method solves the problem of accurate parameter determination. The mechanical model parameters are determined by some algorithm (such as neural network method, genetic algorithm, etc.) when the calculated value of some known information is approximated to its monitored value. However, it still belongs to the continuum model theory or the current load-structure theory. In addition, the earth pressure monitoring method, which directly measures the earth pressure through embedding sensors on the surface of the structure, is suitable for complex and variable geological environment. However, the durability and reliability of the sensors are seriously affected by the harsh underground environment, and the measured data are highly discrete.

In summary, the existing methods are not suitable for the complex and varied external environment, and the determination of the earth pressure load of the tunnel during operation is a new problem. Therefore, it is of great significance to study the calculation method of tunnel earth load suitable for complex and variable environment during operation period.

SUMMARY OF THE INVENTION

The purpose of the present invention is to provide a method for calculating earth pressure load on a tunnel, which solves the boundary problem of calculating the tunnel structure performance, so as to achieve the goal of detecting tunnel structure deformation in time, and determining the earth pressure load on the tunnel quickly, and performing the tunnel structure performance analysis in time.

In order to achieve the above purpose, the technical solution adopted by the present invention is as following:

A method for calculating earth pressure load on a tunnel, characterized in comprising the following steps:

(1) regarding the interaction between the external soil and the tunnel as the earth pressure load on the tunnel structure, under the action of the soil load $[X]_{n*1}$, the deformation of the tunnel structure $[W]_{n*1}$ is formed, where n is the equal parts number of the tube segments, $[X]_{n*1}$ is the earth pressure load, expressed as a matrix of n rows and 1 column; $[W]_{n*1}$ is the deformation of the segment, expressed as a matrix of n rows and 1 column;

(2) establishing physical model of the tunnel structure;

(3) based on said physical model of the tunnel structure, designing n groups of different loads to obtain n groups of different deformation values, and expressed in matrix form as the load matrix $[s]_{n*n}$, and the structural deformation matrix $[v]_{n*n}$;

(4) based on Betty's theorem theory, constructing the equation $[s]_{n*n}*[X]_{n*1}=[v]_{n*n}*[W]_{n*1}$;

(5) solving to get $[Xi]_{n*1}$, which is the earth pressure load on the tunnel.

In the above technical solution, the earth pressure load in the step (1) is an arbitrary direction load, including a surface force perpendicular to the segment or a surface force not perpendicular to the segment.

In the above technical solution, the earth pressure load in the step (1) is a non-uniform distributed load, which is divided into n groups of loads with different values on the surface of the tunnel, and when the tunnel is a shield segment assembly type tunnel, n is the number of segments; when the tunnel is a pouring in site type tunnel, the value of n is determined according to the structural characteristics.

In the above technical solution, in the step (1), the deformation of the tunnel structure is a whole circumferential deformation or a whole spatial deformation, and according to the physical model in the step (2), in case the physical model is a plane model, the deformation of the tunnel is a whole circumferential deformation; in case the tunnel structure is a three-dimensional model, the deformation of the tunnel is a whole spatial deformation.

In the above technical solution, in the step (1), the deformation of tunnel structure is acquired by using a three-dimensional laser scanner, through detecting and acquiring the point cloud of the surface of the tunnel structure, to establish a tunnel structure model based on the point cloud, the tunnel structure deformation value $[W]_{n*1}$ can be obtained.

In the step (2), the physical model of the tunnel structure is a model capable of replacing the original tunnel structure to express the relationship between the load and the structural deformation, and is selected from the group consisting of: homogeneous ring model of routine method, homogeneous ring model of modified routine method, multi-hinge ring model, beam-spring model, beam-joint model, solid model.

The matrix composed of a plurality of load-deformation relationships in the step (3) is a non-singular matrix.

The matrix dimension in the step (3) is greater than or equal to the number of loads in the step (1).

Compared with the prior arts, this invention has following advantages:

1. Compared with the traditional load structure theory, the method of the present invention simplifies the earth load of the tunnel to arbitrary different loads, and the force mode is more reasonable. It can avoid the problem of hypothetical load distribution, load formula and symmetric distribution of traditional load structure theory, and can truly reflect the complex and varied external environment.

2. Compared with the traditional continuum theory, the method of the present invention simplifies the soil action to an arbitrary load and is suitable for complex environments. It can avoid the problems of complex soil constitutive relations, complex modeling and low computational efficiency in the traditional continuum theory.

3. Compared with the traditional back analysis of earth pressure method, the method of the present invention obtains the tunnel structure load from the tunnel deformation is a true inversion calculation theory. The theory of traditional back analysis theory is to determine the mechanical model parameters by some algorithm (such as neural network method, genetic algorithm, etc.) to make the calculated value of some known information close to its monitoring value, but it still belongs to the continuum model theory or current load-structure theory.

4. Compared with the traditional earth pressure detecting method, the method of the invention is applied to the whole life period and the whole range, and has the characteristics of economy and timeliness. Traditional earth pressure testing methods require the deployment of sensors so as not suitable to be applied to all parts of the tunnel and life span due to economic and durability issues. For this invention, no matter during construction or operation period, it is not affected by external construction activities and environment, and is not affected by complex processes. It is not limited to sensor durability and economy. As long as there is a tunnel structure, as long as it can obtain its structural deformation in time, it is possible to calculate the tunnel earth pressure load.

5. The traditional method ignores or weakens the influence of deformation and lining stiffness (structural model), compared to conventional methods, the present invention employs a tunnel physical model and tunnel deformation data, so it can accurately reflect the earth pressure load on the tunnel.

BRIEF DESCRIPTION OF THE DRAWINGS

FIG. 5 is a calculated value of the tunnel earth pressure of the method of the present invention, wherein FIG. 5a shows the tunnel earth pressure distribution trend, and FIG. 5b shows the tunnel earth pressure value.

DETAILED DESCRIPTION OF THE INVENTION

The present invention is further described below by combining with the drawings and embodiment.

Embodiment

A method for calculating earth pressure load on a tunnel, comprising the following steps:

(1) Expressing the relationship between the earth pressure load and the structural deformation of tunnel under real working conditions.

Figure 1:
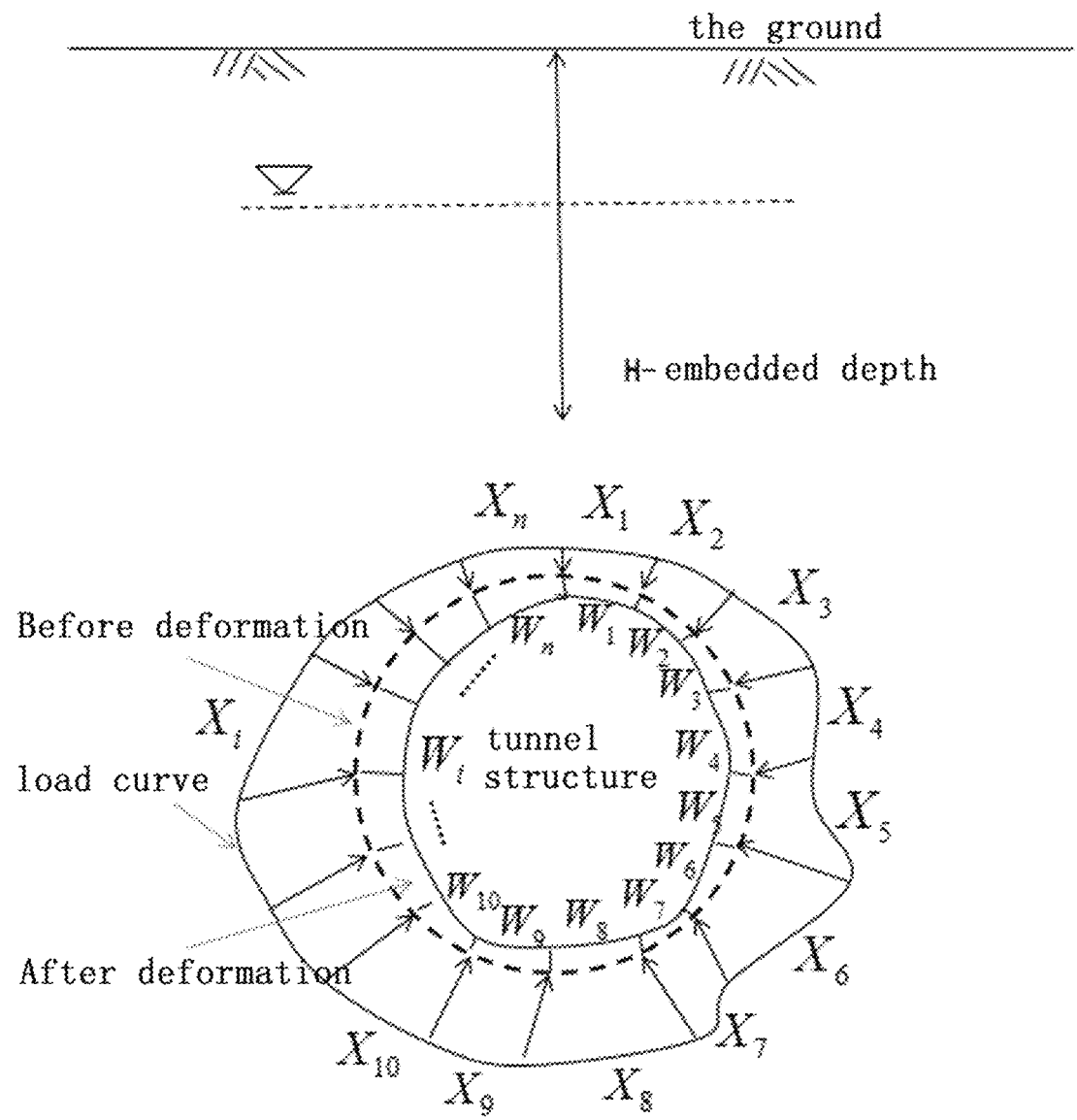
FIG. 1 is a diagram showing the load-deformation relationship of a tunnel structure in the actual environment of the present invention.
Figure 2:
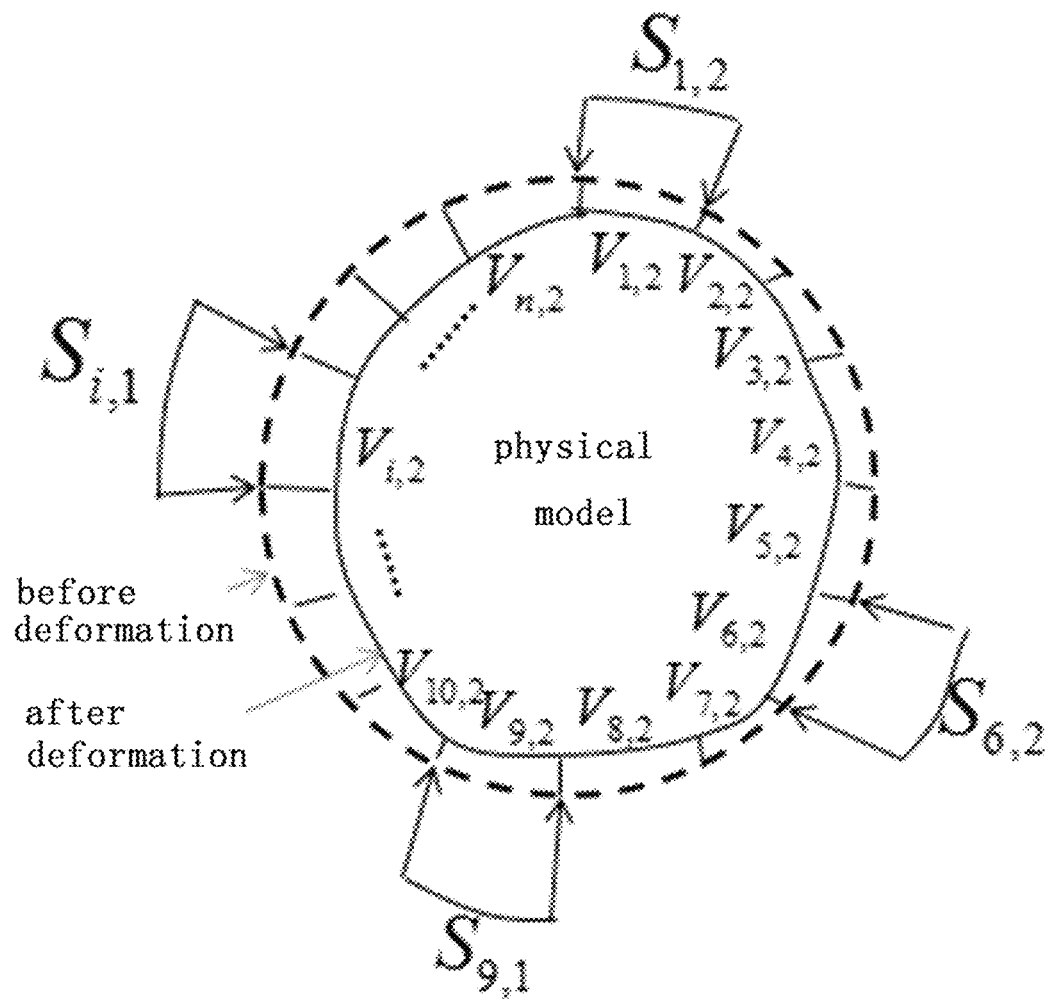
FIG. 2 is a structural load-deformation relationship diagram of a physical model of a tunnel structure according to the present invention.

As shown in FIG. 1, the earth load, including foundation resistance and earth pressure, is regarded as the full space structural load outside the tunnel. All loads are differentiated into n unknown forces $\{X_i\}$, resulting in corresponding full-space shift $\{W_i\}$, where i is the position of the tunnel location i, that is, $\{X_i\}$ is the load at position i and $\{W_i\}$ is the shift at position i. The full-space loads under real working conditions are expressed by $[X]_{n*1}$, and the full-space deformation under real working conditions is expressed by $[W]_{n*1}$.

(2) Expressing the relationship between earth pressure load and structural deformation under design conditions.

Figure 3:
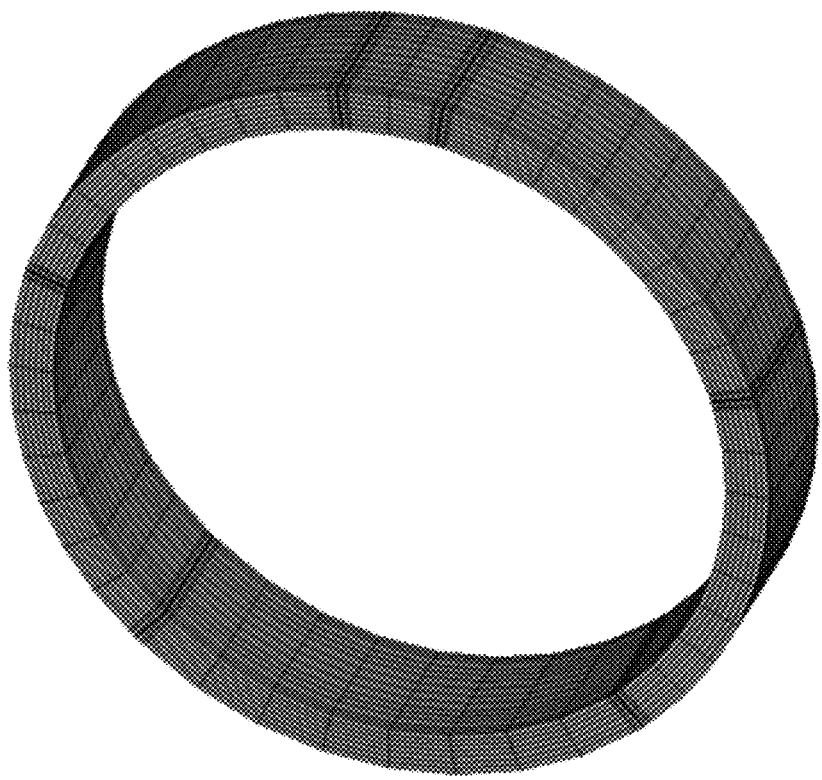
FIG. 3 is a three-dimensional finite element tunnel structure model in an embodiment of the present invention.

A three-dimensional finite element model of tunnel structure (shown in FIG. 3) is established to reflect the load-deformation relationship more truthfully. The n-group load combination $\{S_{ij}\}$ is designed and the n-group structural deformation $\{V_{ij}\}$ is obtained, where is the position of the tunnel location i, and j is the design condition of group j. That is to say, $\{S_{ij}\}$ is the load at position i under load condition of group j, and $\{V_{ij}\}$ is the deformation at position i under load condition of group j. The full-space load under design condition is expressed by $[s]_{n*n}$, and the full-space deformation under design condition is expressed by $[v]_{n*n}$.

Figure 4:
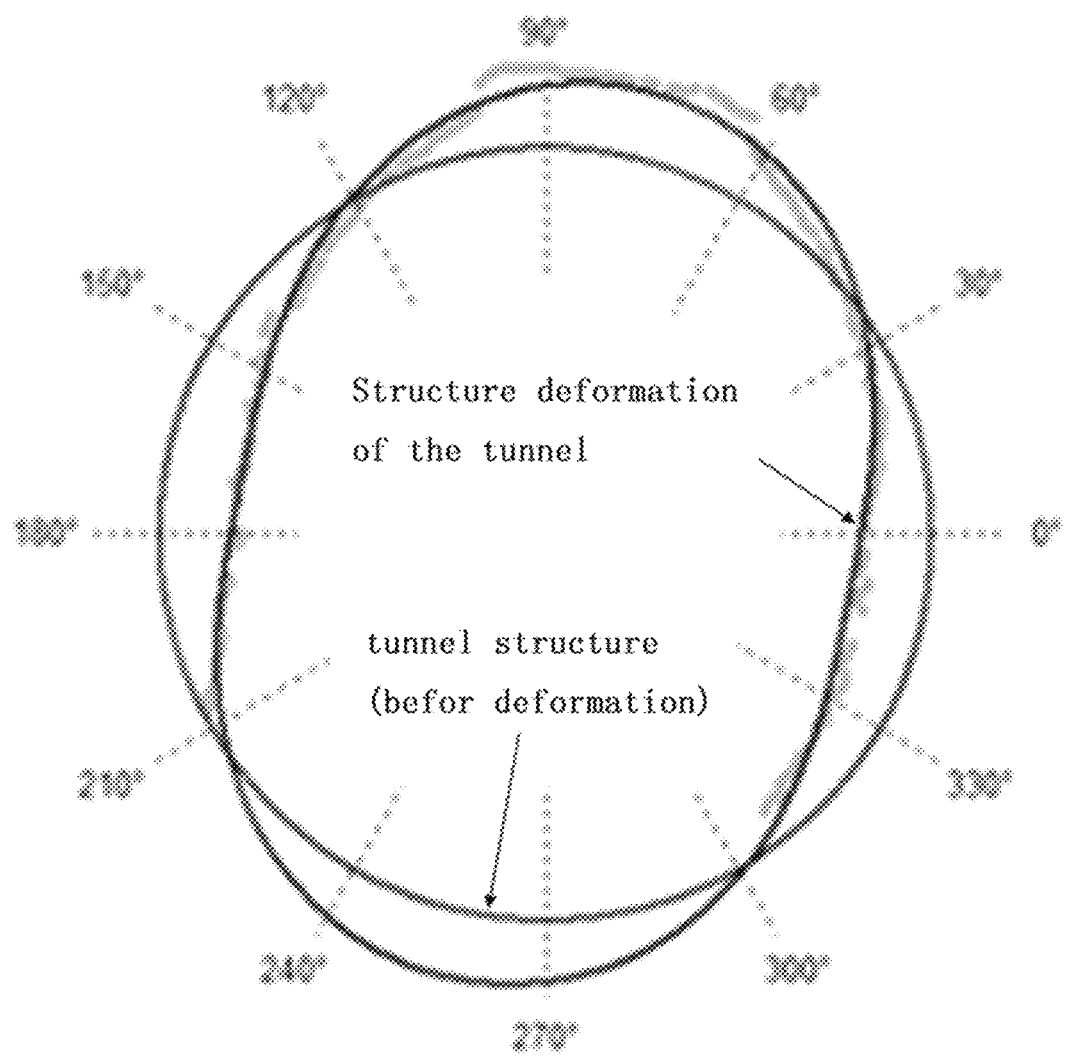
FIG. 4 is a schematic diagram of structural deformation obtained under a real working condition by using a three-dimensional laser scanning method.

(3) FIG. 4 shows the full-space structural deformation $[W]_{n*1}$ under real working conditions acquired by a three-dimensional laser scanning method.

(4) Constructing the equation $[S_{ij}]_{n*n}*[x_i]_{n*1}[V_{ij}]_{n*n}*[W_i]_{n*1}$ based on Betty's theorem.

(5) The solution of $[X_i]_{n*1}$ is the earth pressure load of tunnel.

Figure 5:
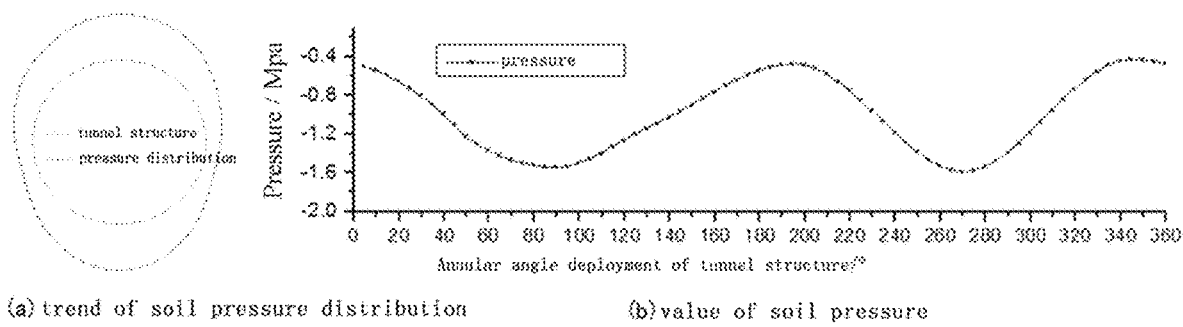

Making formula in the step (4) full rank, the load $[q]_{n*1}$ can be obtained by solving the formula by matrix method. The earth pressure load of the tunnel can be obtained. As shown in FIG. 5, the method of the invention calculates the earth pressure. FIG. 5a is the trend of soil pressure distribution in tunnel, and FIG. 5b is the numerical value of soil pressure in tunnel.

What I claim:

1. A method for calculating earth pressure load on a tunnel, characterized in comprising the following steps:

(1) regarding the interaction between the external soil and the tunnel as the earth pressure load on the tunnel structure, under the action of the soil load $[X]_{n*1}$, the deformation of the tunnel structure $[W]_{n*1}$ is formed, where n is the equal parts number of the tube segments, $[X]_{n*1}$ is the earth pressure load, expressed as a matrix of n rows and 1 column; $[W]_{n*1}$ is the deformation of the segment, expressed as a matrix of n rows and 1 column;

(2) establishing physical model of the tunnel structure;

(3) based on said physical model of the tunnel structure, designing n groups of different loads to obtain n groups of different deformation values, and expressed in matrix form as the load matrix $[s]_{n*n}$, and the structural deformation matrix $[v]_{n*n}$;

(4) based on Betty's theorem theory, constructing the equation $[s]_{n*n}*[X]_{n*1}=[V]_{n*n}*[W]_{n*1}$;

(5) solving to get $[Xi]_{n*1}$, which is the earth pressure load on the tunnel; and (6) evaluating structural performance and applying measures to control tunnel diseases based on the earth pressure load;

wherein in the step (1), the deformation of the tunnel structure is a whole circumferential deformation or a whole spatial deformation, and according to the physical model in the step (2), in case the physical model is a plane model, the deformation of the tunnel is a whole circumferential deformation; in case the tunnel structure is a three-dimensional model, the deformation of the tunnel is a whole spatial deformation; and wherein in the step (1), the deformation of tunnel structure is acquired by using a three-dimensional laser scanner, through detecting and acquiring the point cloud of the surface of the tunnel structure, to establish a tunnel structure model based on the point cloud, the tunnel structure deformation value $[W]_{n*1}$ can be obtained.

2. The method for calculating earth pressure load on a tunnel according to claim 1, wherein the earth pressure load in the step (1) is an arbitrary direction load, including a surface force perpendicular to the segment or a surface force not perpendicular to the segment.

3. The method for calculating earth pressure load on a tunnel according to claim 1, wherein the earth pressure load in the step (1) is a non-uniform distributed load, which is divided into n groups of loads with different values on the surface of the tunnel, and when the tunnel is a shield segment assembly type tunnel, n is the number of segments; when the tunnel is a pouring in site type tunnel, the value of n is determined according to the structural characteristics.

4. The method for calculating earth pressure load on a tunnel according to claim 1, wherein in the step (1), the deformation of the tunnel structure is a whole circumferential deformation or a whole spatial deformation, and according to the physical model in the step (2), in case the physical model is a plane model, the deformation of the tunnel is a whole circumferential deformation; in case the tunnel structure is a three-dimensional model, the deformation of the tunnel is a whole spatial deformation.

5. The method for calculating earth pressure load on a tunnel according to claim 1, wherein the matrix composed of a plurality of load-deformation relationships in the step (3) is a non-singular matrix.

6. The method for calculating earth pressure load on a tunnel according to claim 1, wherein the matrix dimension in the step (3) is greater than or equal to the number of loads in the step (1).

* * * * *